US011189125B2

(12) United States Patent
Hodges et al.

(10) Patent No.: US 11,189,125 B2
(45) Date of Patent: Nov. 30, 2021

(54) APPARATUS AND METHOD FOR DISPENSING LIQUIDS INTO A CONTAINER

(71) Applicant: NICOVENTURES HOLDINGS LIMITED, London (GB)

(72) Inventors: Paul Hodges, London (GB); Alfred Vincent Spencer, London (GB); Edward Awty, London (GB)

(73) Assignee: NICOVENTURES TRADING LIMITED, London (GB)

( * ) Notice: Subject to any disclaimer, the term of this patent is extended or adjusted under 35 U.S.C. 154(b) by 436 days.

(21) Appl. No.: 14/912,595

(22) PCT Filed: Aug. 29, 2014

(86) PCT No.: PCT/GB2014/052626
§ 371 (c)(1),
(2) Date: Feb. 17, 2016

(87) PCT Pub. No.: WO2015/028815
PCT Pub. Date: Mar. 5, 2015

(65) Prior Publication Data
US 2016/0200463 A1    Jul. 14, 2016

(30) Foreign Application Priority Data
Aug. 20, 2013    (GB) .................................... 1315499

(51) Int. Cl.
*B65B 3/04*       (2006.01)
*B65B 7/16*       (2006.01)
(Continued)

(52) U.S. Cl.
CPC ................ *G07F 17/18* (2013.01); *B65B 3/04* (2013.01); *B65B 7/16* (2013.01); *G06Q 20/18* (2013.01);
(Continued)

(58) Field of Classification Search
CPC .......... G07F 13/02; G07F 13/10; G07F 13/06; G07F 17/0064; G07F 17/0092;
(Continued)

(56) References Cited

U.S. PATENT DOCUMENTS 1,795,503 A    3/1931  Leazar et al.
3,421,430 A    1/1969  Freise et al.
(Continued)

FOREIGN PATENT DOCUMENTS

AU    2006101030        1/2007
CA        2653886 A1    8/2009
(Continued)

OTHER PUBLICATIONS

PCT International Search Report and Written Opinion of the International Searching Authority for PCT/GB2014/052626, dated Nov. 19, 2014, 15 pages.
(Continued)

*Primary Examiner* — Thomas M Wittenschlaeger
(74) *Attorney, Agent, or Firm* — Patterson Thuente Pedersen, P.A.

(57) ABSTRACT

A machine for dispensing a vaporizable liquid into a container for use in an electronic inhalation device is disclosed. The machine comprises a reservoir of liquid, a dispensing port to receive an empty container to be filled, and a dispensing mechanism fluidly connected to the reservoir for dispensing a quantity of liquid from the reservoir to a container received in the dispensing port. The machine also comprises a controller connected to the dispensing mechanism to control operation thereof, and a user-operable interface connected to the controller for a user to actuate the machine. Also disclosed is a method of operation of such a machine and a system of a plurality of such machines.

13 Claims, 9 Drawing Sheets

(51) Int. Cl.
*A24F 47/00* (2020.01)
*G06Q 20/18* (2012.01)
*G07F 17/18* (2006.01)
*G07F 13/10* (2006.01)
*G07F 13/06* (2006.01)
*G07F 13/02* (2006.01)
*G07F 17/00* (2006.01)
*A24F 15/015* (2020.01)

(52) U.S. Cl.
CPC .............. *G07F 13/02* (2013.01); *G07F 13/06* (2013.01); *G07F 13/10* (2013.01); *G07F 17/0064* (2013.01); *G07F 17/0092* (2013.01); *A24F 15/015* (2020.01)

(58) Field of Classification Search
CPC .. G06Q 20/18; B65B 3/04; B65B 7/16; A24F 47/008; A24F 15/015
See application file for complete search history.

(56) References Cited

U.S. PATENT DOCUMENTS

| | | | |
|---|---|---|---|
| 3,870,135 | A | 3/1975 | Allen |
| 4,195,751 | A * | 4/1980 | Smith ................. G07F 13/06 221/129 |
| 4,911,212 | A * | 3/1990 | Burton ............... B01F 13/1055 141/104 |
| 5,339,875 | A * | 8/1994 | English ............... B01J 19/004 141/104 |
| 5,497,598 | A | 3/1996 | Boldrini |
| 5,587,089 | A | 12/1996 | Vogel et al. |
| 5,842,597 | A | 12/1998 | Friedman et al. |
| 5,858,105 | A * | 1/1999 | Pritchard ............. B08B 3/126 134/1 |
| 5,971,205 | A | 10/1999 | Michaels et al. |
| 6,116,460 | A | 9/2000 | Kim |
| 6,606,605 | B1 | 8/2003 | Kolls |
| 6,902,084 | B2 | 6/2005 | Bauman |
| 7,431,176 | B2 | 10/2008 | Bauman |
| 7,455,223 | B1 * | 11/2008 | Wilson ................ G06Q 20/18 221/9 |
| 7,593,897 | B1 | 9/2009 | Kolls |
| 7,756,604 | B1 | 7/2010 | Davis et al. |
| 8,176,948 | B2 * | 5/2012 | Carrig ................. H04W 4/08 141/21 |
| 8,335,586 | B2 | 12/2012 | Ochi |
| 9,205,387 | B2 * | 12/2015 | Bueno ................. A23L 2/56 |
| 2004/0040983 | A1 | 3/2004 | Ziesel |
| 2005/0080679 | A1 | 4/2005 | Barton et al. |
| 2006/0190128 | A1 | 8/2006 | Brooke |
| 2006/0235569 | A1 * | 10/2006 | Watts .................. G07F 9/02 700/237 |
| 2006/0254428 | A1 * | 11/2006 | Glucksman ......... A47J 31/3609 99/302 P |
| 2007/0012712 | A1 | 1/2007 | Syiau |
| 2007/0055573 | A1 * | 3/2007 | Grell .................. G06Q 20/209 705/24 |
| 2007/0157559 | A1 * | 7/2007 | Till ..................... B41J 2/06 53/411 |
| 2011/0264284 | A1 * | 10/2011 | Rudick ............... B67D 1/0888 700/283 |
| 2011/0264285 | A1 | 10/2011 | Mattos, Jr. et al. |
| 2012/0004770 | A1 * | 1/2012 | Ooyen ................ G06F 19/3462 700/235 |
| 2012/0035761 | A1 * | 2/2012 | Tilton ................. G07F 13/065 700/233 |
| 2012/0167906 | A1 | 7/2012 | Gysland |
| 2012/0227860 | A1 | 9/2012 | Jeremiah |
| 2012/0291791 | A1 * | 11/2012 | Pradeep .............. A24F 47/008 131/273 |
| 2012/0310408 | A1 * | 12/2012 | Stache ................ G06Q 20/325 700/237 |
| 2013/0043271 | A1 | 2/2013 | South |
| 2013/0061981 | A1 | 3/2013 | Bragg et al. |
| 2013/0156903 | A1 * | 6/2013 | Bombeck ............. A47J 31/30 426/231 |
| 2013/0160658 | A1 * | 6/2013 | Torrisi ................ A23N 1/00 99/512 |
| 2014/0033649 | A1 * | 2/2014 | Ishikawa ............. B65B 1/04 53/405 |

FOREIGN PATENT DOCUMENTS

| | | |
|---|---|---|
| CN | 2180593 Y | 10/1994 |
| CN | 1107435 A | 8/1995 |
| CN | 1202676 A | 12/1998 |
| CN | 1548345 A | 11/2004 |
| CN | 1688493 A | 10/2005 |
| CN | 2936978 Y | 8/2007 |
| CN | 101287662 A | 10/2008 |
| CN | 201135393 Y | 10/2008 |
| CN | 101553128 A | 10/2009 |
| CN | 102015515 A | 4/2011 |
| CN | 201847355 U | 6/2011 |
| CN | 102177071 A | 9/2011 |
| CN | 202257753 U | 5/2012 |
| CN | 202473080 U | 10/2012 |
| CN | 202904738 U | 4/2013 |
| DE | 1170180 B | 5/1964 |
| EP | 1734349 A2 | 12/2006 |
| EP | 2065860 A1 | 6/2009 |
| EP | 2392217 A1 | 12/2011 |
| GB | 2462319 A | 2/2010 |
| GB | 2463234 A | 3/2010 |
| GB | 2467343 A | 8/2010 |
| JP | 2010152757 A | 7/2010 |
| JP | 2011088678 A | 12/2010 |
| WO | WO 200145058 A1 | 6/2001 |
| WO | WO2005036484 A1 | 4/2005 |
| WO | WO 2005071514 A2 | 8/2005 |
| WO | WO2007091265 A2 | 8/2007 |
| WO | WO2008093248 A2 | 8/2008 |
| WO | WO2009032038 A1 | 3/2009 |
| WO | WO-2009032938 A2 | 3/2009 |
| WO | WO 2009105342 A2 | 8/2009 |
| WO | WO2009152115 A1 | 12/2009 |
| WO | WO2010040397 A1 | 4/2010 |
| WO | WO 2010140937 A1 | 12/2010 |
| WO | WO2012025644 A1 | 3/2012 |
| ZA | 200602835 A | 9/2007 |

OTHER PUBLICATIONS

PCT International Preliminary Report on Patentability for PCT/GB2014/052626, dated Dec. 9, 2015, 15 pages.
LeClair D. Rasberry Pi-welding Bartendo robot mixes drinks for your guests, Gizmag Mar. 5, 2013 http://www.gizmag.com/bartendro-raspbery-pi-drink-robot/26526/?utm_source=Giz.
Coca Cola Interactive video vender website, 2009 http://www.coca-colacompany.com/press-center/a-v-library/interactive-video-vender.
YouTube, Coca-Cola Vending Machine—Touch Screen, published Mar. 19, 2012 on http://www.bigumigu.lcom/sxsw https//www.youtube.com/watch?v=vMrHGLa4ZaA.
You Tube Innovative Vending Machine in the City of the Future Living Lab, Benessere in Movimento Project, published Oct. 4, 2012 https://www.youtube.com/watch?v=UAc0_8kvdC4.
Youtube, Introducing Pepsi Interactive Vending Machine, Oct. 5, 2012, https://www.youtube.com/watch?v=u92iFy8iOKE.
Mogg T, New isample vending machine knows exactly who's using it. Digital Trends, Dec. 26, 2011, http://www.digitaltrends.com/cool-tech/new-isample-vending-machine-knows-exactly-whos-using-it/.
Van Veendaal. 20 Interactive Vending Machines Campaigns. ViralBlog, Sep. 11, 201 http://www.viralblog.com/trends-innovations/20-interactive-vending-machines-campaigns/.
Inoue M et al., A New Series of Cigarette Vendors, Fuji Electric Journal., May 1991, vol. 64, No. 5.

(56) References Cited

OTHER PUBLICATIONS

Anonymous: "Remove acid by means of siphon", Apr. 26, 2005. XP0055150000. Retrieved from the internet: URL: http://web.archive.org/web/20050426102328/http://sciencepark/etacude.com/projects/gas/gas3.php (retrieved Oct. 30, 2014).
Chinese Office Action, Application No. 201480047669.4, dated May 15, 2017, 12 pages (20 pages with translation).
Zhang, Guoquan, et al., Packaging Mechanical Design, pp. 72-74, Printing Industry Press, Feb. 28, 2013, first edition.
Chinese Office Action, Application No. 201480047669.4, dated Jan. 10, 2018, 15 pages (27 pages with translation).
Application and Filing Receipt for U.S. Appl. No. 29/583,922, filed Nov. 10, 2016, inventors: Powell et al.
Office Action for Chinese Application No. 201910049171.6, dated Nov. 16, 2020, 18 pages.
Office Action for Chinese Application No. 201910049171.6, dated May 14, 2021, 9 pages.
Office Action for Chinese Application No. 201910049171.6, dated Sep. 27, 2021, 7 pages.

* cited by examiner

APPARATUS AND METHOD FOR DISPENSING LIQUIDS INTO A CONTAINER

RELATED APPLICATIONS

The present application is a National Phase entry of PCT Application No. PCT/GB2014/052626, filed Aug. 29, 2014, which claims priority from GB Patent Application No. 1315499.2, filed Aug. 30, 2013, said applications being hereby incorporated by reference herein in their entireties.

TECHNICAL FIELD

This specification relates to an apparatus and method for dispensing liquids into a container.

BACKGROUND

Electronic cigarettes ("e-cigarettes") may comprise a reservoir of liquid which is vaporized or atomized by the device for inhalation by a user. Once the liquid supply is exhausted, the reservoir must be replaced by a new full reservoir of liquid, in the case of disposable reservoirs, or must be refilled, in the case of reusable reservoirs.

SUMMARY

In this specification there are described embodiments of an apparatus or machine for dispensing a vaporizable liquid into a container for use in an electronic inhalation device, the machine comprising a reservoir for containing liquid, a dispensing port to receive an empty container to be filled, a dispensing mechanism fluidly connected to the reservoir for dispensing a quantity of liquid from the reservoir to a container received in the dispensing port, a controller connected to the dispensing mechanism to control operation thereof, and a user-operable interface connected to the controller for a user to actuate the machine. In this specification there is also described a method of operating an apparatus or machine for dispensing a vaporizable liquid into a container for use in an electronic inhalation device, the method comprising receiving a dispensing instruction via a user-operable interface connected to a controller, the controller actuating a dispensing mechanism to dispense a quantity of liquid from a reservoir of the machine to a dispensing port and into a container held in the dispensing port.

DETAILED DESCRIPTION

Figure 1:
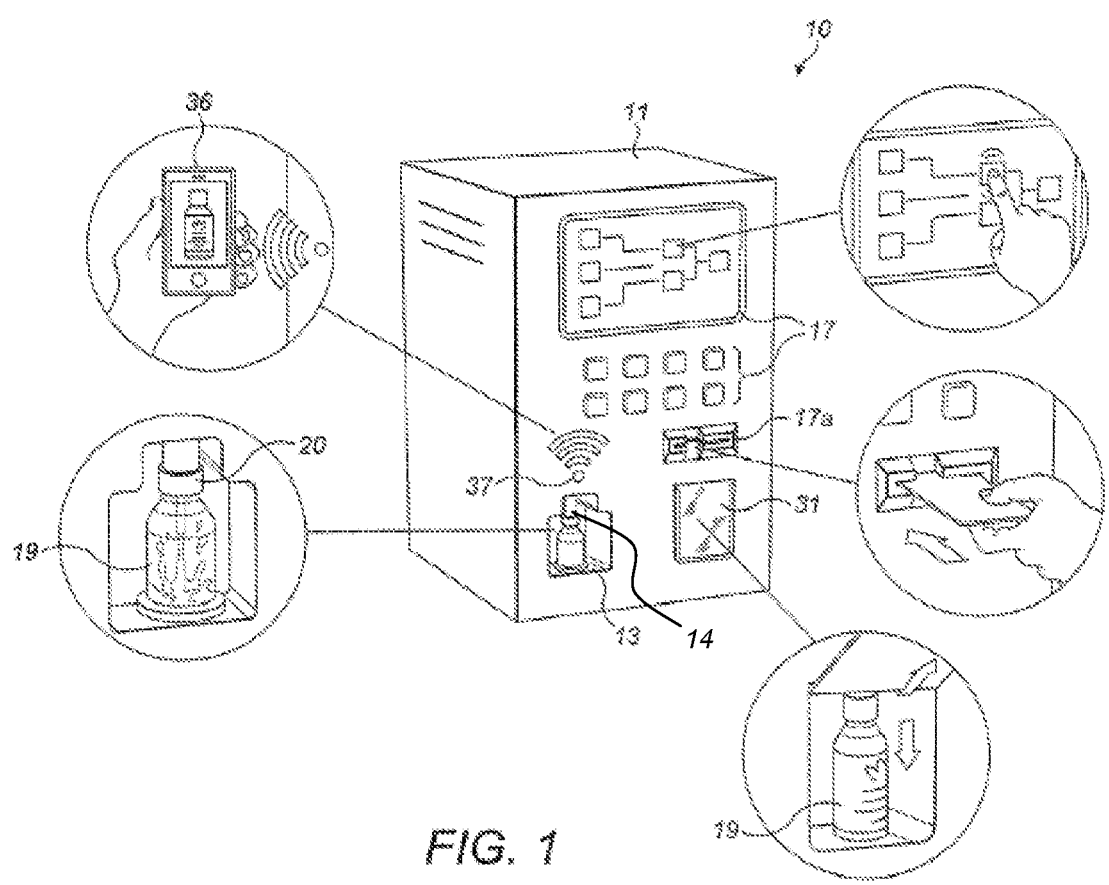
FIG. 1 shows a perspective view of a vending machine of a first embodiment.
Figure 2:
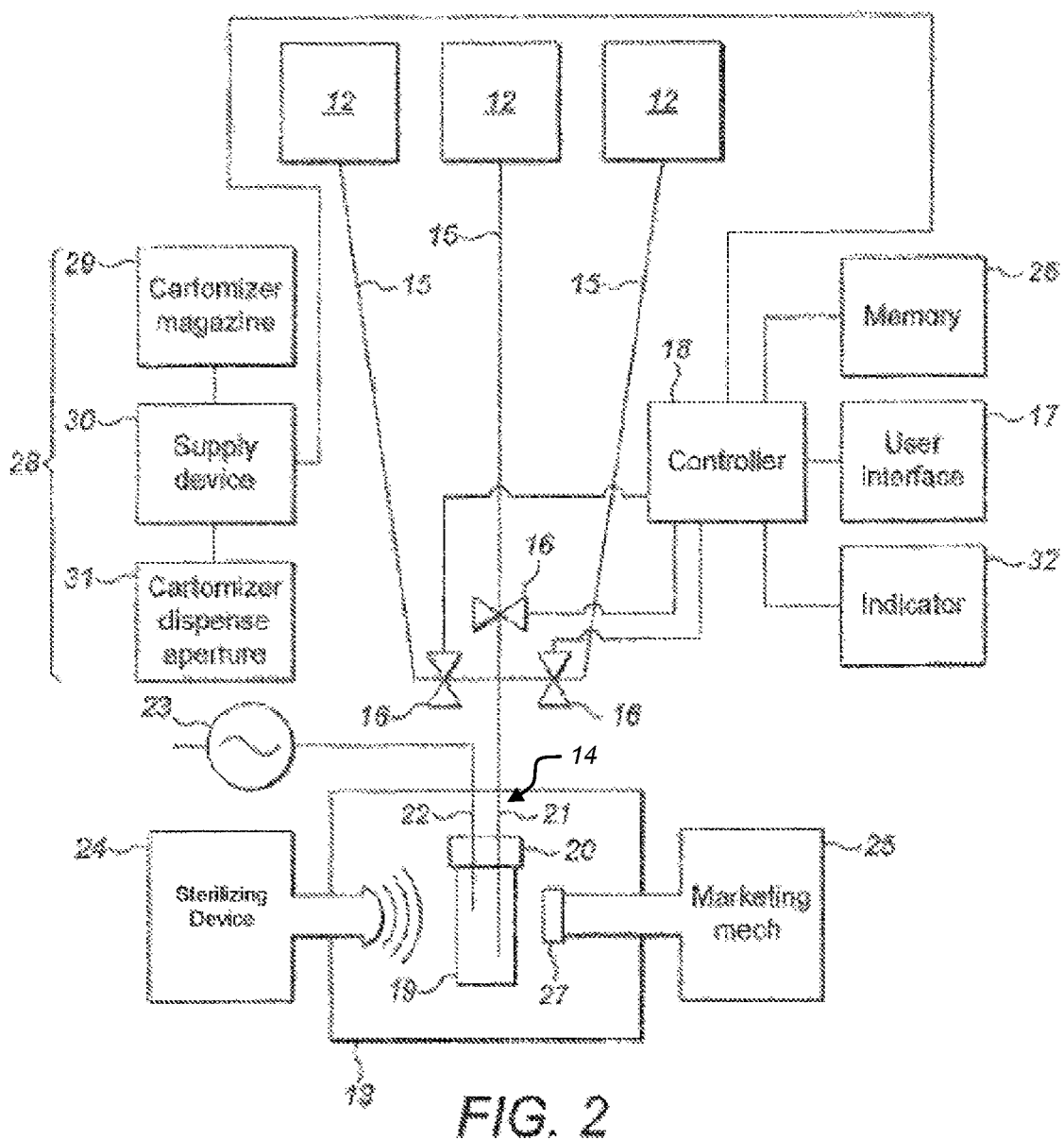
FIG. 2 shows a functional schematic view of the vending machine shown in FIG. 1.

Referring to FIGS. 1 and 2, there is shown a vending machine 10 according to a first embodiment for dispensing liquid for use in electronic vapor inhalation devices such as e-cigarettes (hereinafter referred to as e-liquid). The vending machine 10 comprises a housing 11 within which is provided a plurality of e-liquid reservoirs 12. Each reservoir 12 may contain a different formulation of e-liquid, although alternatively, the same e-liquid may be contained in each reservoir 12.

The vending machine 10 comprises a dispensing port 13 configured to receive an e-liquid container of an electronic vapor inhalation device (known as a "cartomizer") and a dispensing mechanism 14 associated with the dispensing port 13 and configured to fill a cartomizer 19 received in the dispensing port 13 with e-liquid from one or more of the reservoirs 12. The dispensing mechanism 14 is fluidly connected to each of the reservoirs 12 by supply pipes 15 and each supply pipe 15 includes a supply valve 16 to control the flow of e-liquid from the respective reservoir 12 to the dispensing mechanism 14 and out of the dispensing port 13.

The vending machine 10 includes a user interface 17 and a controller 18 connected to the user interface 17. A memory unit 26 is also connected to the controller 18. The user interface 17 is operable by a user to initiate an e-liquid dispensing operation and to select, if appropriate, a choice of e-liquid formulation from the options available from the vending machine 10. The user interface 17 may also be operable to take payment from a user by means of card payment device, a pre-paid card reader, or other wireless or otherwise payment means 17a. Furthermore, the user interface may also be configured to perform an age-verification function to determine that the user is authorized to use the vending machine. This may be by input of a user-specific code or a user-ID recognition device such as a RFID tag and receiver, or user-ID card reader. It is also intended that the vending machine 10 may be operated by input or reading of a "smart" token, via the user interface 17, 17a that can only be bought from a licensed retailer upon proof of minimum age of the purchaser, to ensure age-verification. Such token may also only be usable in combination with password/pass code to further ensure secure operation and prevent unauthorized use.

Figure 4:
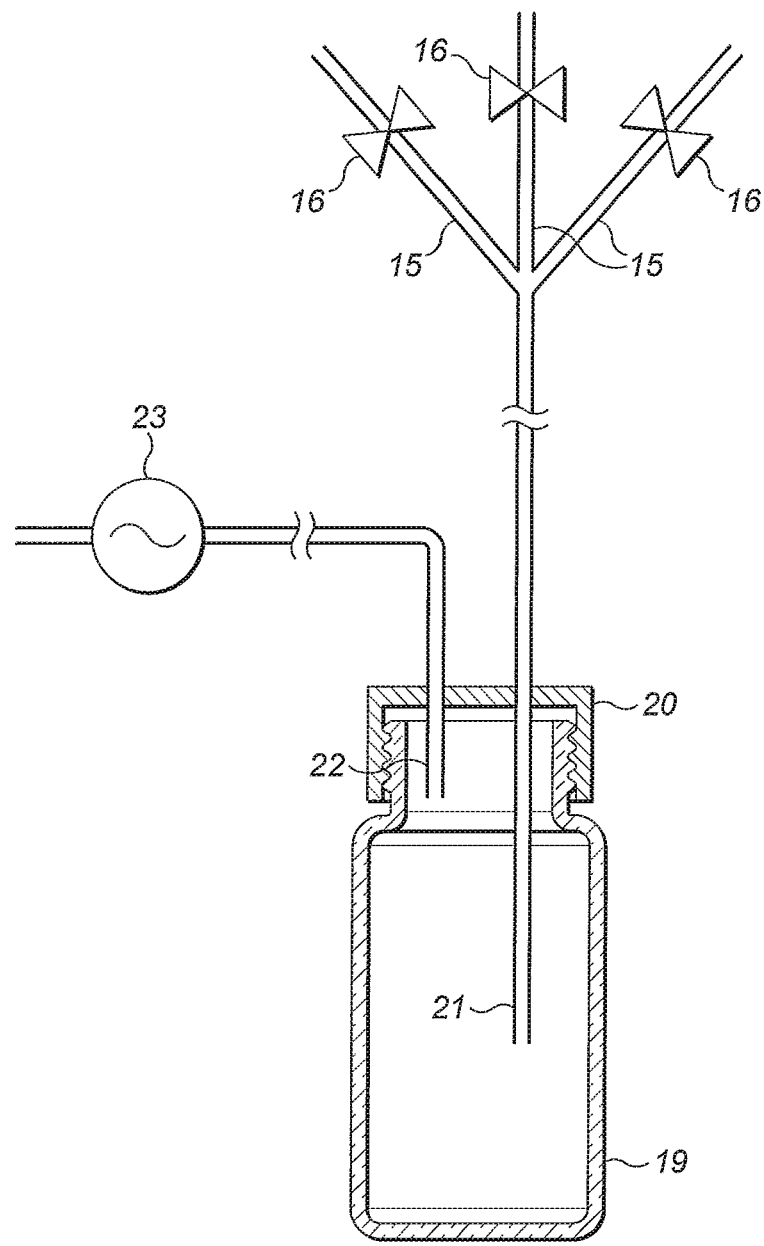
FIG. 4 shows a schematic cross-sectional view of a portion of the dispensing mechanism of the vending machine shown in FIGS. 1-2, with a cartomizer held in the dispensing port.

The controller 18 is connected to the supply valves 16 and to the dispensing mechanism 14 and is configured to control these in response to input from a user via the user interface 17 to effect dispensing of e-liquid into a cartomizer received in the dispensing port 13. The dispensing port 13 is configured to receive an empty cartomizer 19 and to seal around an open end of the cartomizer 19. The cartomizer 19 may be held within the dispensing port 13 by a screw thread, bayonet fitting or other releasable coupling. The dispensing mechanism 14 comprises a dispensing head 20 which includes an e-liquid supply duct 21 and a vacuum duct 22. The liquid supply duct 21 is fluidly connected to the supply pipes 15, and the vacuum duct 22 is connected to a vacuum pump 23. When a cartomizer 19 is held in the dispensing port 13, the ends of the liquid supply duct 21 and vacuum duct 22 are in fluid communication with the inside of the cartomizer 19. The liquid supply duct 21 may extend further into the interior of the cartomizer 19 than the vacuum supply duct 22 and the latter terminating adjacent the open end of the cartomizer 19, as can be seen in FIG. 4.

The vending machine 10 includes a sterilizing device 24 which is configured to clean and sterilize user-supplied cartomizers 19 prior to being filled with e-liquid. The sterilizing device comprises an ultrasonic emitter which is disposed proximate the dispensing port 13 and positioned such that it is close to a cartomizer 19 when received therein, and which is configured to emit ultrasonic sound waves to the cartomizer 19. The sterilizing device 24 may emit sound waves in the frequency range of 20-400 kHz for optimum sterilizing efficacy.

The vending machine 10 includes a cartomizer marking mechanism 25 which is configured to print information on a cartomizer 19 received in the dispensing port 13 relating to the details and formulation of the e-liquid dispensed into the cartomizer. For example, this information may comprise the time, date and location of dispensing, the ingredient levels or formulation of the e-liquid, such as nicotine content and/or flavor information, health warning or other regulatory information, and any associated branding, logo or trade mark. This information may be printed directly onto a side wall of a cartomizer 19 whilst being held in the dispensing port 13 by a printing head 27, such as an ink-jet printer head. However, in an alternative embodiment, the information could be printed onto an adhesive label which may either be automatically applied to the side of a cartomizer 19 by an automated labeling mechanism (not shown) whilst the cartomizer 19 is held in the dispensing port 13, or could be separately supplied from a label dispenser (not shown) on the vending machine 10 for a user to manually adhere to the filled cartomizer 19 of e-liquid once filled.

The controller 18 is connected to both the sterilization device 24 and the marking mechanism 25 to control the operation of both.

Although the vending machine 10 is configured to receive user-supplied cartomizers 19 and refill them, the vending machine also includes a cartomizer supply mechanism 28 whereby, if a user does not have an empty cartomizer 19 to be refilled, the vending machine 10 can provided a new empty cartomizer 19 to be filled. The cartomizer supply mechanism 28 includes a magazine 29 to hold a stock of new empty cartomizers 19 and supply device 30 to feed an empty cartomizers 19 from the magazine 29 to a cartomizer dispensing aperture 31, from which a user may retrieve the dispensed cartomizer and manually insert it into the dispensing port 13. Embodiments are envisaged in which the supply device 30 may alternatively, or also, be configured to supply empty cartomizers 19 directly from the magazine 29 to the dispensing port 13 and automatically fit the cartomizer therein ready to be filled with the dispensed e-liquid.

Figure 3:
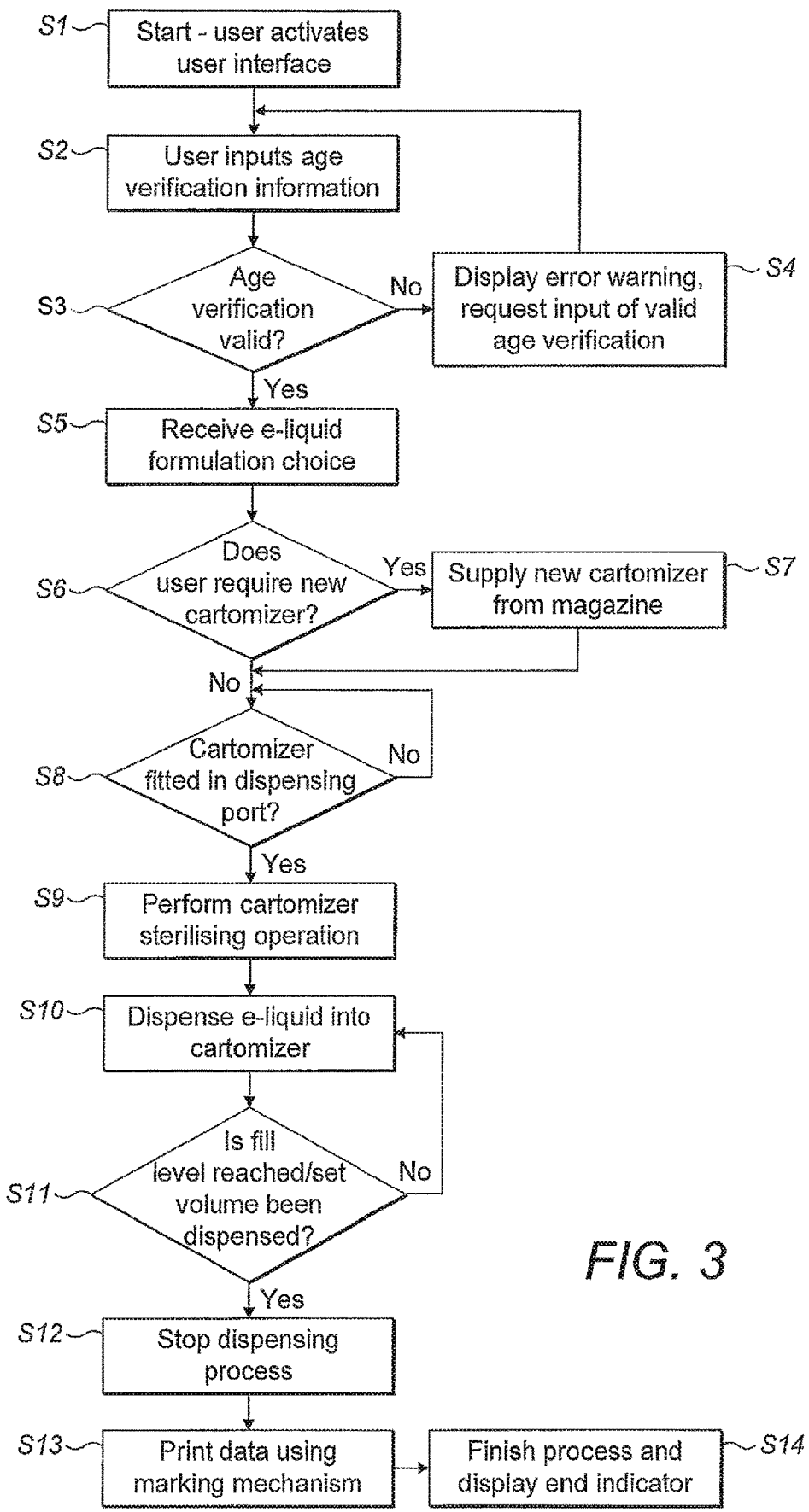
FIG. 3 shows an operational flow chart of the vending machine of FIGS. 1 and 2.

A mode of operation of the vending machine 10 will now be described, with reference to the operational flow chart of FIG. 3. The user may initially operate the user interface 17 to initiate an e-liquid dispensing procedure, at S1. The user would use the user interface 17 to pass the age verification security check, either by entry of a specific code, reading of an identity card or detection of a RFID identity tag, or other appropriate means, at S2, and the controller 18 determines at S3 whether the age verification check is valid or not. If not, the controller operates a display portion of the user interface 17 to indicate age verification error (S4) and requests the user to re-confirm the age verification check. If the vending machine is configured with different e-liquids in the various reservoirs 12, the user may input via the user interface 17 their choice of e-liquid formulation to be dispensed into the cartomizer 19 at S5.

The user may then operate the user-interface 17 and payment means 17a to effect payment for dispensing of the selected e-liquid.

At S6, the controller queries whether the user has their own used cartomizer to be refilled, or requires a new cartomizer to be provided by the vending machine 10. If the user indicates via the user interface 17 that a new cartomizer is required, the controller operates the cartomizer supply mechanism 28 so that the supply device 30 collects a cartomizer 19 from the magazine 29 and provides it to the dispensing aperture 31 (S7). The user may then insert their empty cartomizer 19, or newly provided cartomizer 19, into the dispensing port 13 and secure it in place as appropriate by the screw thread, bayonet fitting, or other fitment, so that the dispensing head 20 seals over the opening in the cartomizer 19.

It will be appreciated that if a user requires a new cartomizer to be dispensed, this will have an additional cost than if a user supplies their own used cartomizer. As such, the user may, at earlier S6, input via the user interface 17 whether they have their own used cartomizer to be refilled or require a new cartomizer to be provided by the vending machine 10 and then payment may be taken to include payment for a new cartomizer if necessary.

The controller 18 then determines, at S8, whether the cartomizer 19 is fitted into the dispensing port 13. If not, it loops back to repeat the enquiry until it detects a cartomizer in place.

At S9, the controller 18 activates the sterilizing device 24 to sterilize the cartomizer 19 held within the dispensing port 13 prior to initiating a filling operation. The sterilizing device may comprise an ultrasonic emitter actuated by the controller 18 to emit ultrasonic sound waves at the device. Alternatively, or in addition, the sterilizing device 24 may comprise a sterilizing fluid supply means fluidly connected to the dispensing head 20 by a sterilizing fluid duct, configured to introduce a sterilizing liquid or gas into the cartomizer 19, and subsequently evacuate the sterilizing fluid, before a filling operation occurs. Such sterilizing fluid may comprise water, liquid chemical disinfectant, or a sterilizing gas. In an embodiment, sterilizing fluid is used in combination with an ultrasonic emitter for enhanced sterilizing efficacy. Yet further, the dispensing port 13 may be provided with a drying device, such as an infra-red heater or an air duct to blow flushing, possibly heated, clean air into the cartomizer, to dry the interior thereof and flush out/ evaporate any residual sterilizing fluid, before a filling operation commences.

Following completion of the sterilizing procedure, the controller 18 actuates the dispensing mechanism 14 to dispense e-liquid into the cartomizer 19 at S10. The controller 18 operates respective supply valve 16 to allow the chosen e-liquid to flow from the reservoir 12 through the supply pipe 15 to the dispensing head 20 of the dispensing mechanism 14. The controller also actuates the vacuum pump 23 so that air is drawn out of the cartomizer 19 through the vacuum duct 22 to create a reduced pressure within the cartomizer 19. This draws the e-liquid through the supply pipe 15, through the supply duct 21 in the dispensing head 20 and into the cartomizer 19.

The vending machine 10 may include a flow meter in the supply duct 21 or supply pipe 15 and, for example, which is or may be connected to the controller 18, to measure the amount of e-liquid dispensed and to control the supply valve 16 to shut and the vacuum pump 23 to stop when the required volume of e-liquid has been dispensed to fill the cartomizer 19. In an alternative embodiment however, the supply duct 21 may not extend fully into the bottom of the cartomizer 19 but may terminate at a predetermined fill level within the cartomizer 19. The supply duct may include a pressure-sensing valve that senses a back pressure in the duct when the liquid level in the cartomizer reaches the pre-determined fill level and then closes to prevent any more e-liquid being dispensed into the cartomizer 19. At S11, the vending machine 10 determines whether the cartomizer 19 is filled with e-liquid, by either detecting a fill level of the e-liquid within the cartomizer, or by detecting when a pre-determined volume of e-liquid has been dispensed, or when a pressure sensing valve in the supply duct 21 closes. At S12, the controller 18 stops dispensing e-liquid if it is detected at S12 that the cartomizer has been filled.

After (or during) the cartomizer filling process, at S13, the controller 18 operates the marking mechanism 25 to print information from the print head 27 onto the side wall of the cartomizer held in the dispensing port 13. The controller 18 may operate the print head to print information relating to the dispensed e-liquid such as that listed above.

Once the cartomizer 19 has been filled with e-liquid and printed, the dispensing process finishes at S14, and the user may then remove the cartomizer 19 from the dispensing port 13 and insert it into an electronic vapor inhalation device, such as an e-cigarette. The controller 18 may actuate an indicator 32, such as an LED, a message on a display screen, or an audible signal, to confirm that the filling operation is complete and that a user may remove the filled cartomizer 19 from the dispensing port 13, as part of the process end. The LED, display screen or audible signal of the indicator 32 may be part of the overall user interface 17 or may be a separate component.

In an embodiment, the dispenser may be configured to receive and refill different configurations of cartomizers 19, for example, those of different e-cigarette manufacturers. The user could use the user interface 17 to select the type of cartomizer to be refilled and the memory 26 may store volume information for each known cartomizer so as to be able to dispense the correct measured volume of e-liquid into the cartomizer dependent on which cartomizer the user selected.

In an embodiment, it is intended that the vending machine 10 may be able to provide a blend of e-liquids contained in the respective reservoirs 12. This may be achieved by the controller 18 operating more than one of the supply valves 16 in the supply pipes 15 so that e-liquid is drawn from more than one reservoir 12 during the cartomizer filling process described above. The separate supply pipes 15 may combine at a manifold into a single supply duct 21 within the dispensing head 20, or alternatively, the supply pipes 15 may terminate in separate respective supply ducts 21 within the dispensing head 20. The blend of e-liquids may be selected to provide e-liquids of, for example, varying nicotine content, flavor strength or flavor blends. The vending machine 10 may provide a user with a pre-programmed selection of e-liquid blends, the respective details of which may be stored in the memory 26, such as volume ratios of the liquids required from the each of the respective reservoirs 12 to create the chosen blend. Alternatively, the vending machine may be operable to create a completely bespoke blend following a user's selection input via the user interface 17.

The vending machine 10 described above includes one dispensing port to receive cartomizers 19 to be filled with e-liquid. However, alternative embodiments may comprise a plurality of dispensing ports, each configured to receive a different configuration of cartomizer 19. This would allow the vending machine to accept and refill cartomizers of a number of different manufacturers. In such an embodiment, each dispensing port may comprise a cartomizer sensor connected to the controller 18 so that the controller 18 can detect which dispensing port has a cartomizer 19 coupled thereto and control the dispensing head 20 in the correct dispensing port to perform a dispensing operation. Again, the memory 26 may store volume information relating to a cartomizer associated with each dispensing port so that the correct volume of e-liquid is dispensed depending on which dispensing port a cartomizer is inserted into.

The vending machine 10 described above is configured to print information relating to the dispensed e-liquid directly onto the cartomizer 19. However, in an alternative embodiment, the marking mechanism may print the relevant information on a separate label which may then be either automatically adhered to the cartomizer 19 whilst being held in the dispensing port 13 by a label applicator of the marking mechanism or, may be provided out of the vending machine 10 for a user to manually adhere to the cartomizer 19 once removed from the dispensing port 13.

Figure 5A:
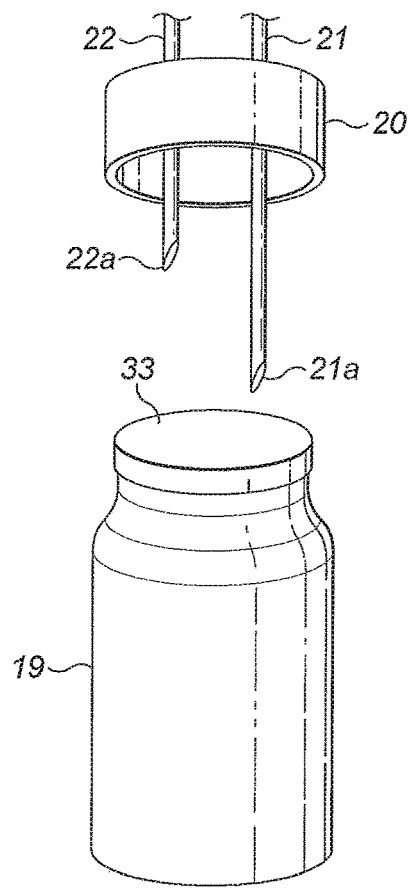
FIGS. 5A and 5B respectively show views of a cartomizer and dispensing head of a second embodiment, separately and in engagement.
Figure 5B:
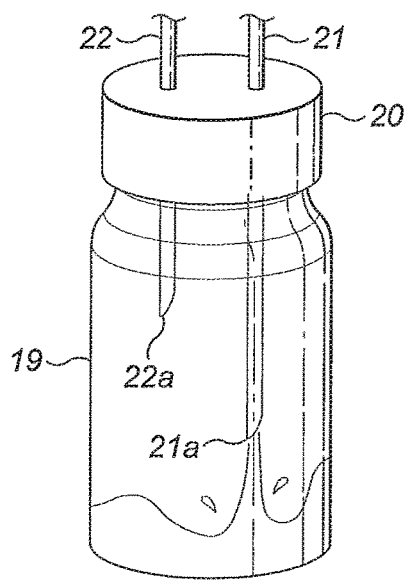

In an embodiment, it may be desirable for cartomizers received in, and filled by, the vending machine 10, to include a seal such that once the cartomizer has been refilled the e-liquid is sealed within the cartomizer until the cartomizer is inserted into an e-cigarette. Such an embodiment is shown in FIGS. 5A and 5B, in which the cartomizer 19 comprises an elastomeric cover 33 over the opening in the top, and the supply duct 21 and vacuum duct 22 may terminate as syringe needles 21a, 22a which, when the cartomizer 19 is fitted into the dispensing port 13, pierce the elastomeric cover 33 to allow the e-liquid to be introduced into, and air evacuated from, the interior of the cartomizer 19. Once the cartomizer has been filled, the needles are retracted out of the cartomizer, and the resilience of the elastomeric cover 33 seals the needle holes, thereby sealing the cartomizer opening.

Figure 6A:
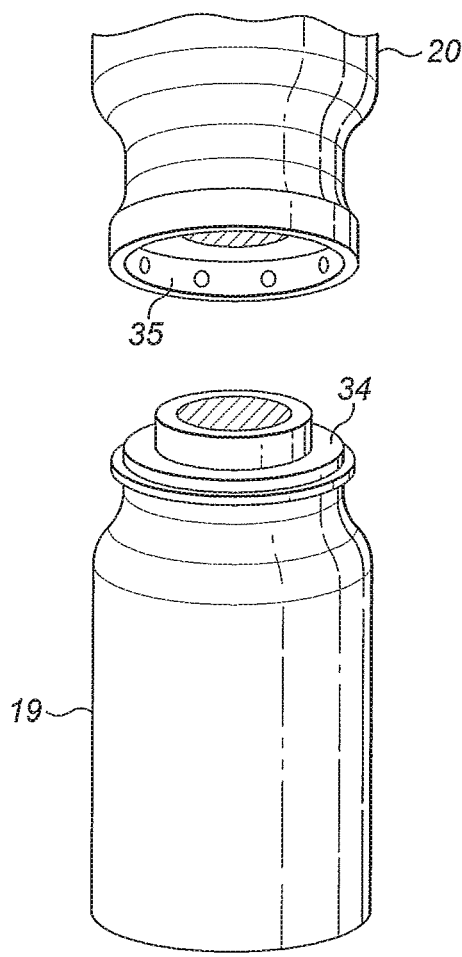
FIGS. 6A and 6B respectively show views of a cartomizer and dispensing head of a third embodiment, separately and in engagement.
Figure 6B:
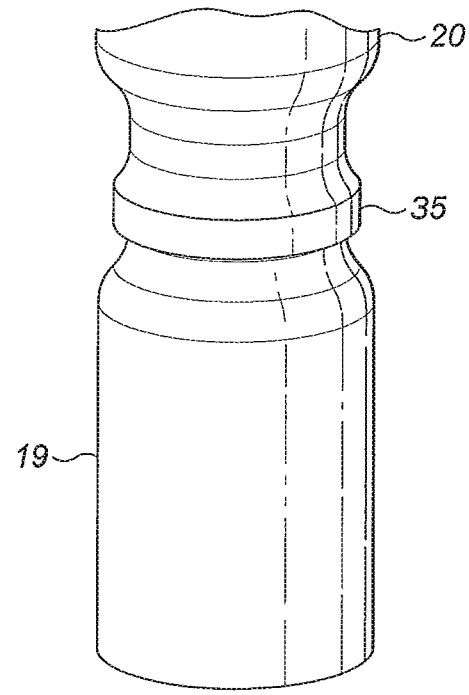

In an alternative embodiment, shown in FIGS. 6A and 6B, the cartomizer may be provided with connector 34 in its open end having one or more valves therein, which is configured to engage with, and be opened by, a corresponding coupling 35 in the dispensing head 20 when the cartomizer 19 is fitted within the dispensing port 13. Therefore, e-liquid may be introduced into the cartomizer through an open valve in the connector 34, and once filled, the cartomizer 19 is removed from the dispensing port 13, the valve in the connector 34 automatically closes, sealing the cartomizer 19. Furthermore, an e-cigarette into which the cartomizer may be intended to be inserted, may comprise a corresponding coupling to engage with the connector 34 to open the valve therein when the cartomizer is fitted within the e-cigarette.

In an embodiment, the vending machine 10 may be capable of wirelessly receiving a user's 'order' from a smart phone 36 or other portable electronic device via a receiver 37 within the vending machine 10 and connected to the controller 18. In such an embodiment, a suitable application may be loaded on the smart phone 36 which stores a user's previous or favored e-liquid formulations, and a user may select a particular formulation on the smart phone 36 which is then transmitted to the receiver 37 of the vending machine 10 to initiate a dispensing operation as described above. In such an embodiment, payment may be able to also be made wirelessly for the vending operation via the smart phone 36 or other portable electronic device.

It will be appreciated that the vending machine 10 of the above-described embodiments provides regulated vending of e-liquids of known formulations and with a range of strengths and flavors which may be pre-made or may be bespoke mixtures created on-demand by individual users. Although in the embodiment of vending machine 10 described above, three reservoirs 12 are shown, in alternative embodiments, more reservoirs may be provided to enable a greater variety of bespoke e-liquid blends to be created and dispensed. Known e-cigarette liquids may comprise nicotine, flavorant and a dilutent. Dilutents may comprise Propylene Glycol, Vegetable Glycol or Aqueous Glycerine. The vending machine may include a single nicotine reservoir, a plurality of flavorant reservoirs and a plurality of dilutent reservoirs with different dilutents such as those listed above. The vending machine 10 may be configured to dispense a range of e-liquids within set-limits determined by a manufacturer or regulatory demands by combining different volumes of nicotine, flavorant and dilutent. For example, e-liquids with a nicotine content from zero to a maximum regulatory limit may be dispensed, with a range of user-selected flavors and concentrations. In order to provide a greater variety of e-liquid blends, the vending machine 10 may include a plurality of flow meters in the respective supply pipes 15 from each reservoir, all connected to the controller 18. The controller may be able to control the supply valve 16 of each supply pipe 15 to close when a desired quantity of liquid from the respective reservoir 12 is dispensed, as detected by the respective flow meter and in accordance with the specific blend ratios of the e-liquid formulation selected by the user.

It is intended the embodiments of the vending machine 10 may comprise one or more mass flow controllers, which may be part of the dispensing mechanism 14 or may be positioned within each of the supply pipes 15, to measure and control the flow rate of e-liquid therethrough. The or each mass flow controller may be connected to the controller 18. The mass flow controllers may generally comprise a mass flow sensor connected to a valve which the mass flow controller controls to maintain the flow rate at a desired level, the value of which may be received from the controller 18. Therefore, a desired quantity of e-liquid can be accurately dispensed since the e-liquid flow rate is accurately controlled.

Figure 7:
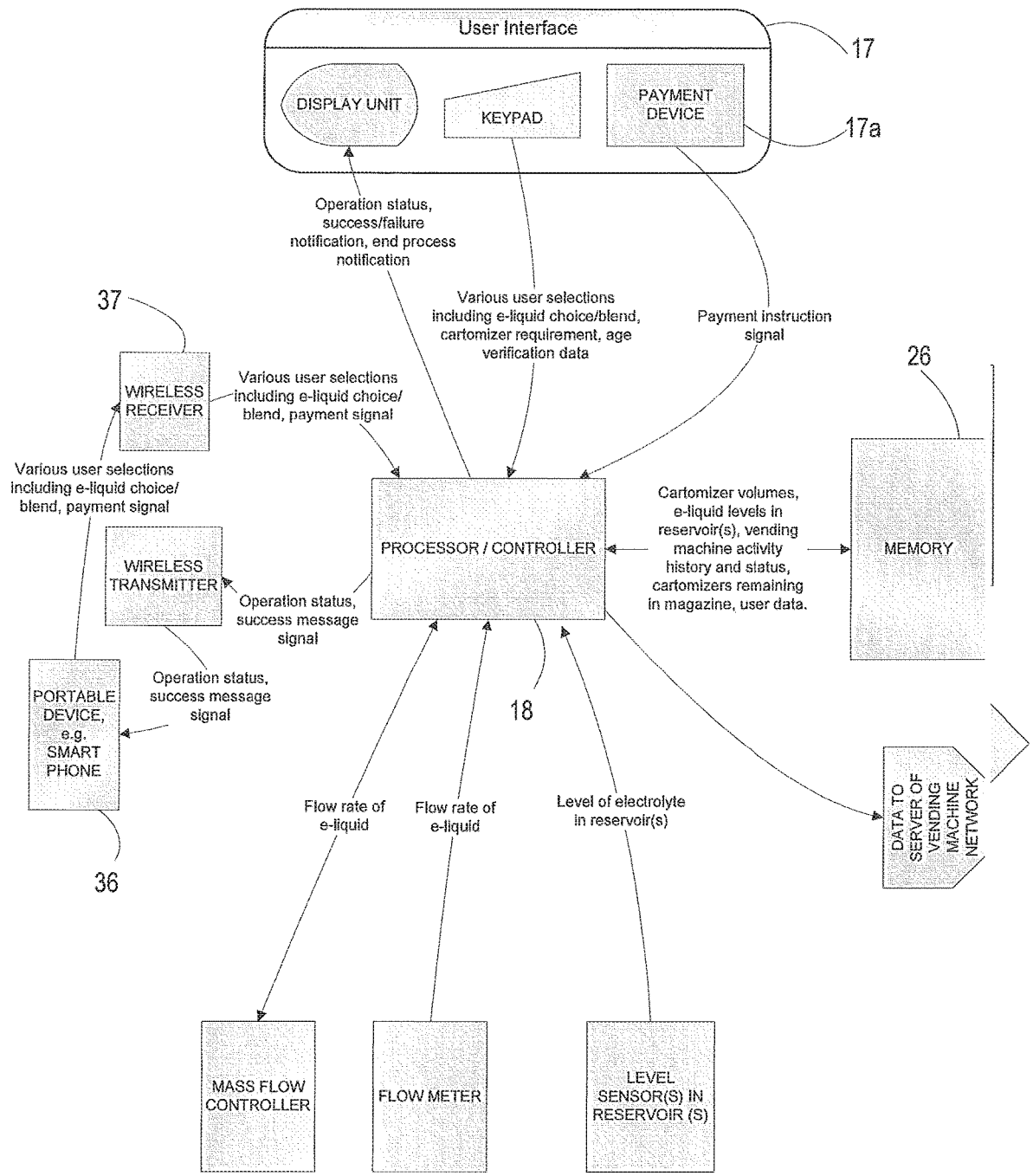
FIG. 7 shows a first exemplary data flow diagram of the vending machine shown in FIGS. 1-2.

FIG. 7 shows a first exemplary data flow diagram for the vending machine 10, and how the various data flows between the components of the machine and devices operable with the machine. The wireless receiver 37 may be configured to receive data from a remote electronic device such as a smart phone 36, possibly via a dedicated app, relating to the user's order and selection of e-liquid to be dispensed, or e-liquid blend, and also to effect payment for use of the vending machine. The data may also comprise age verification data, such as date of birth or a registered user reference. This information is passed to the controller (which may comprise one or more processors). The vending machine may additionally include a wireless transmitter such that the operation status and/or payment status of the user's order may be relayed to the portable device to be displayed to the user.

The user interface 17 may comprise a display unit, keypad and payment device 17a. The payment device may send payment instructions and signals to the controller 18. The keypad may be used to select the desired e-liquid choice or blend and whether a new cartomizer 19 is required. The data may also comprise age verification data, such as date of birth or a registered user reference. Data relating to confirmation of the order, operational status and/or payment status may be transmitted to the display unit for display to the user.

The memory 26 may comprise RAM, ROM, a database and/or cache memory. It may store information relating to specific known cartomizer dimensions and volumes, to be accessed by the controller 18 during operation of the vending machine. It may also store current machine status data such as volumes of e-liquid in the respective reservoirs, which it may receive via the controller from level sensors in the reservoirs. The memory may also store all activity history of the vending machine over a predetermined time period, such as number of cartomizers refilled, total volume of e-liquid dispensed, a count of new cartomizers dispensed from the machine, and how many are remaining. It may also store information on users of the vending machine, including preferred choices, blends, user ID references, and frequency of use.

If the apparatus comprises one or more mass flow controllers, data relating to the desired flow rate, which may be stored in the memory for different cartomizer refilling processes, may be provided to the mass flow controller and data relating to the flow rate control, and total flow may be relayed back from the mass flow controller to the controller 18 and may be stored in the memory 26. Also, if the apparatus comprises one or more flow meters, data from these relating to the flow rate of e-liquid will be fed to the controller 18, and may be stored in the memory 26.

It is intended that a plurality of vending machines 10 may be provided and connected to each other as a networked e-liquid vending machine system. In such a system, the various vending machines would be connected to a remote server, and real-time data may be collected from the vending machines 10 within the network, analyzed and stored on the server. The data collected could include type and volume of e-liquid dispensed and remaining reservoir levels in individual vending machines within the network, to enable an efficient maintenance schedule to be created so that vending machines within the network can have their reservoirs refilled before they are fully empty. The consumption levels of the different e-liquid formulations within the network of vending machines may also be stored and analyzed, including preferred blend ratios of e-liquids selected by users. The collected data could also relate to individual customer profiles, if available though a dispensing operation (e.g. from age/ID verification data input, or smart-phone connection via a personlized user account), for such data to be used for marketing purposes. This data may be transmitted to the server in real time or alternatively, may be stored in the memory 26 and transferred to the server at regular intervals or on demand.

Figure 8:
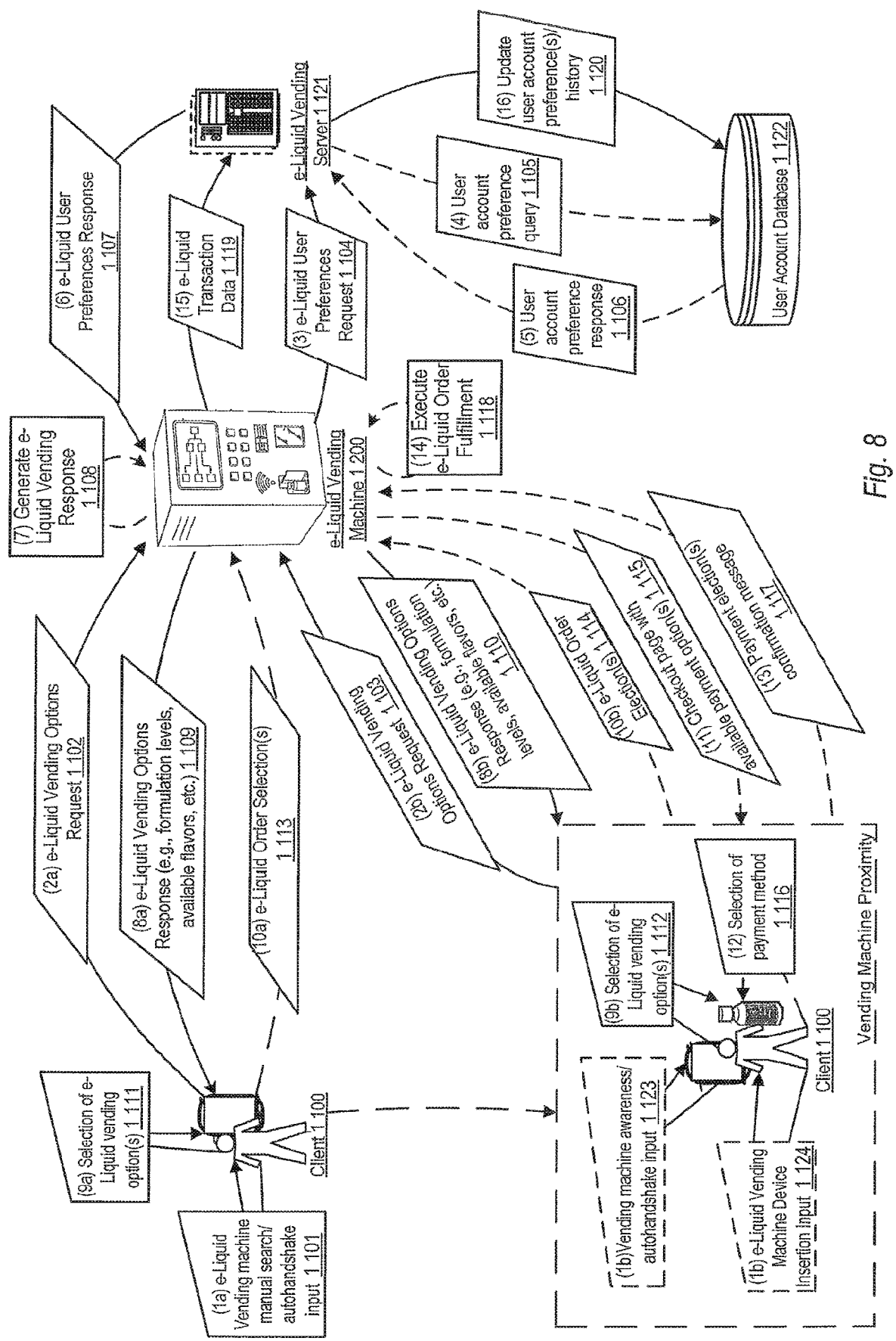
FIG. 8 shows a second exemplary data flow diagram of the vending machine shown in FIGS. 1-2 including network components.
Figure 9:
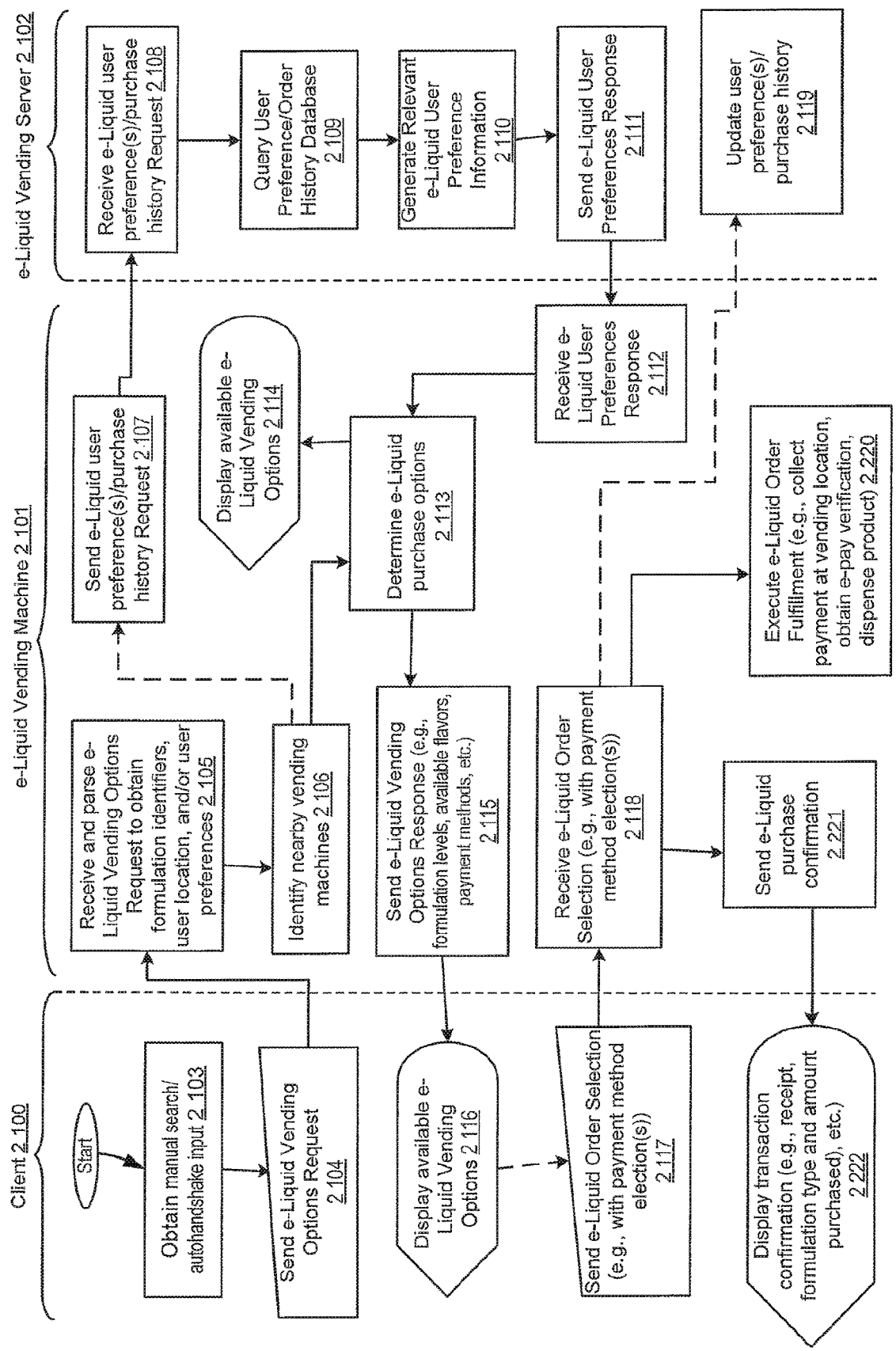
FIG. 9 shows an exemplary logic flow diagram of operation of the vending machine shown in FIGS. 1-2.

FIG. 8 shows a second exemplary data flow diagram for the vending machine 10 and its data flow within a network of such vending machines and between a remote electronic device operable with the vending machine. FIG. 9 shows an exemplary logic flow diagram for operation of the vending machine 10 within a network of vending machines and in conjunction with a remote electronic device operable with the vending machine. Referring to FIG. 8, in some implementations, a client 1100 such as a user's portable device may become "aware" of a nearby e-liquid vending machine (e.g., via "autohandshake," radio frequency identification (RFID), near-field communication (NFC), and/or the like) and generate an e-liquid vending options request, e.g., 1102, for example containing a security certificate and/or credentials (e.g., username and password) to authenticate a user's identity, age, etc., along with user preference information stored on the client (e.g., preferred formulation(s), preferred flavor(s), cartomizer/device type, etc.) and/or user location information (e.g., GPS coordinates and/or the like). For example, the client 1100 may provide an e-liquid vending options request 1102 in the form of a (Secure) Hypertext Transfer Protocol ("HTTP(S)") POST message including data formatted according to the eXtensible Markup Language ("XML"). An example e-liquid vending options request 1102, substantially in the form of a HTTP(S) POST message including XML-formatted data, is provided below:

```
POST /orderrequest.php HTTP/1.1
Host: www.bat.com/e-liquid_dispense
Content-Type: Application/XML
Content-Length: 484
<?XML version = "1.0" encoding = "UTF-8"?>
<e-liquid_vending_options_request>
    <request_ID>1126515</request_ID>
    <timestamp>yyyy-mm-dd hh:mmE-:ss</timestamp>
    <user_ID>JDoe@gmail.com</user_ID>
    <credentials>
        <password>secret123</password>
        <access_key>Fort7992</access_key>
    <GPS_coord>Latitude_Longitude_Elevation</GPS_coord>
  <preference_details>
    <formulation_ID>150</formulation_ID>
    <flavor_ID>menthol</flavor_ID>
    <cartomizer_type>100</cartomizer_type>
    <refill_amount>15mL</refill_amount>
    ...
  </preference_details>
  <client_details>
    <client_IP>192.168.23.122</client_IP>
    <client_type>smartphone</client_type>
    <client_model>HTC Hero</client_model>
    <OS>Android 2.2</OS>
    <app_installed_flag>true</app_installed_flag>
    ...
  </client_details>
</e-liquid_vending_options_request>
```

In other embodiments, the e-liquid vending options request 1102 may be generated as a result of a user manually requesting, e.g., via a website or application running on the client 1100, information pertaining to nearby vending options for refilling his/her e-cigarette. The e-liquid vending options request 1102, in some embodiments, may be transmitted to a nearby e-liquid vending machine, e.g., 1200, or to multiple e-liquid vending machines via an e-liquid vending machine network.

The e-liquid vending machine may, in some embodiments, send an e-liquid user preferences request 1105 to an e-liquid vending server (e.g., 1121). In some implementations, the e-liquid vending server 1121 may receive a (Secure) Hypertext Transfer Protocol ("HTTP(S)") POST message including data formatted according to the eXtensible Markup Language ("XML"). An example e-liquid user preferences request 1104, substantially in the form of a HTTP(S) POST message including XML-formatted data, is provided below:

```
POST /sample_user_preference_query.php HTTP/1.1
Host: www.bat.com/e-liquid_dispense
Content-Type: Application/XML
Content-Length: 484
<?XML version = "1.0" encoding = "UTF-8"?>
<sample_query_request>
    <request_ID>1126515</request_ID>
    <timestamp>yyyy-mm-dd hh:mmE-:ss</timestamp>
    <user_ID>JDoe@gmail.com</user_ID>
    <credentials>
        <password>secret123</password>
        <access_key>Fort7992</access_key>
    <GPS_coord>Latitude_Longitude_Elevation</GPS_coord>
  <sample_user_preference_query name="e-liquid_user_profile">
    <query num=1>
        Select CartomizerType.Number, Formulation.Pref from
eLiquid_User_Profiles where UserAccountNum=JDoeAccountNum
        ...
    </query>
    <query>
        ...
    </query>
  </sample_user_preference_query>
</sample_query_request>
```

The e-liquid vending server 1121 may perform the requested query (e.g., via user account preference query 1105) on user account database 1122 to determine user preference information (e.g., preferred formulation(s), preferred flavor(s), cartomizer/device type(s) owned/used, preferred filling location(s), etc.). The e-liquid vending server 1121 may, as a result of the query, return an e-liquid user preferences response 1107 to the e-liquid vending machine 1200.

The e-liquid vending machine may, at 1108, compile information obtained from one or both of the user client device and the user account database (e.g., via the e-liquid vending server 1121) in order to generate an e-liquid vending options response 1109 including one or more of the following: user authentication verification, location(s) of vending machine(s), formulation levels available within the machine(s), available flavorants, cartomizer/device types accommodated, payment methods accepted, etc., and may display the available e-liquid vending options to the user, e.g., via client 1100 and/or via a user interface on the e-liquid vending machine 1200. A user may then choose to physically proceed to the location of the vending machine and complete the remainder of the e-liquid refill/purchase transaction via a user interface which is built into the vending machine itself. Alternatively, a user may make a purchase/refill selection via his/her mobile device, e.g., at 1111 or 1112, from among the available e-liquid vending options, and an e-liquid order selection 1113/1114 may be sent to the e-liquid vending machine 1200. In some embodiments, a checkout page for completing the purchase/refill transaction may be transmitted from the e-liquid vending machine 1200 to the client 1100, e.g. presenting a variety of payment options from which the user may choose and authorize via a payment election confirmation message 1117, while in other embodiments a user may complete and pay for a purchase/refill transaction via a user interface on the e-liquid vending machine 1200, for example via touch screen, keyboard, mouse, magnetic stripe reader, and/or the like.

The e-liquid vending machine 1200 may, at 1118, execute the e-liquid order fulfillment, for example by refilling e-liquid into an already-installed cartomizer/device, by dispensing an empty cartomizer/device to be refilled, by dispensing a pre-filled cartomizer/device, and/or by requesting (via a user interface on the e-liquid vending machine 1200 or via the client 1100) mechanical insertion of the cartomizer/device to be refilled on the front of the vending machine and subsequently refilling once insertion has been verified, etc. In some embodiments, the cartomizer/device may contain its own memory storage, from which case the e-liquid vending machine 1200 may retrieve information relevant to the purchase/refill transaction, such as the model of the device, the age/usage history of the device, filling capacity, etc. The vending machine may further be capable, upon insertion of the device, of detecting a fill level within the device and/or properties of the formulation contained therein. The vending machine may further be equipped to indicate when the cartomizer/device refilling process has been completed, for example by rendering a message on the e-liquid vending machine 1200 user interface, transmitting a message (e.g., by rendering a webpage, sending an email message/SMS text) to a client 1100, emitting a tone, flashing a light, etc.

In one implementation, the order fulfillment may include generation of transaction data 1119 including, for example, the user's selected formulation type and quantity, cartomizer/device type, GPS-derived location information, etc. An example of transaction data 1119 formatted in XML is provided below:

```
<order_fulfillment_transaction_data>
    <request_ID>1126515</request_ID>
    <timestamp>yyyy-mm-dd hh:mm:ss</timestamp>
    <user_ID>JDoe@gmail.com</user_ID>
    <formulation_ID>150</formulation_ID>
    <flavor_ID>menthol</flavor_ID>
    <cartomizer_type>100</cartomizer_type>
    <refill_amount>15mL</refill_amount>
</order_fulfillment_transaction_data>
```

Transaction data 1119 may, in some embodiments, be transmitted to the e-liquid vending server 1121 and/or to client 1100, for example as an addition/update to the record(s) contained therein (e.g., user account database 1121 and smart phone memory, respectively).

The logic flow diagram of FIG. 9 illustrates the step-wise transactional process between a client 2100, the vending machine 2101 and the server 2102 of a network of vending machines. The respective steps or tasks of the logic flow diagram are explained within the logic step boxes of FIG. 9 and so a detailed description of the respective steps or tasks in the process will not be repeated in detail here.

The housing 11 is intended to be a secure casing for the vending machine to resist being broken into or tampered with. As such, it is advantageously made from a strong material such as steel, and includes a secure locking means so that only authorized personnel may access the interior of the vending machine 10. Furthermore, the housing 11 may include an alarm (not shown) that activates if the housing 11 is interfered with or opened by an unauthorized person. Such alarm may be connected to the controller 18 and be configured to lock the dispensing function of the vending machine 10 until the alarm is reset. These tamper-resistant measures, plus the age-verification measures mentioned above, enhance the security of the vending machine 10. In addition, if the vending machine 10 or housing 11 has been tampered with such that an alarm of the machine activates, this activation may be communicated to the server of the network so that appropriate servicing can be scheduled.

In an embodiment, the dispensing mechanism 14 may include a seal label applicator which is configured, upon completion of a dispensing operation, to apply a seal-label over the top of the filled cartomizer which is to be peeled off by a user before use in an inhalation device. Such a seal label may include tamper-evident features so that if the cartomizer is not for immediate use in an inhalation device, it will be apparent if the cartomizer has been interfered with since it was last filled.

The refilling of empty used cartomizers with e-liquid provides environmental benefits of reducing waste.

Although the embodiments described above have generally related to a vending machine, in the sense that some type of payment made be made in order to operate the machine, the approach described herein may be utilized with a machine or apparatus for dispensing a vaporizable liquid that does not involve any form of vending or payment to the machine. One possibility, for example, is that the machine is located in an establishment (hotel, club, etc), where any payment is handled by a separate transaction, e.g. at a till. A user may then be permitted to use the machine, for example, by allowing the user to obtain physical access to the machine, by providing the user with some appropriate token (e.g. key or smart card) that allows operation of the machine, by an operator sending a control instruction to the machine (by wired or wireless communication) to permit user operation, etc. The above approaches (and other potential mechanisms) may be used in combination with one another if so desired).

In some cases the machine may be maintained behind a counter, and is therefore operated on behalf of a user by an appropriate staff member of the establishment. The operator may have some appropriate token (e.g. password, key or smart card) that allows operation of the machine.

In some cases the machine may be provided as a home use apparatus, so that it can be located in a domestic setting. It may be more economical for a user to run such a home-use dispensing machine than to purchase individual e-cigarettes or individual cartridges (cartomizers) containing e-liquids for such devices. Furthermore, the machine 10 allows the e-liquid containers to become re-usable (rather than disposable) devices. In addition, the machine offers the user greater control over the content, e.g. flavoring, for any given container re-fill, rather than being limited to the particular options available for individually purchased containers.

Such a home use apparatus will generally be smaller than a commercial vending machine, and typically will not incorporate any form of payment mechanism in the user interface 17. However, it may still have some appropriate access control facility, e.g. by a passcode, key or smart card, to help prevent undesired usage of the machine. Such a home use apparatus may include the various features of a dispensing machine described above in relation to FIGS. 1-9, as appropriate depending upon the particular circumstances of the apparatus.

In order to address various issues and advance the art, the entirety of this disclosure shows by way of illustration various embodiments in which the claimed invention(s) may be practiced and provide for superior liquid dispensers, methods and systems thereof. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist essentially of, various combinations of the disclosed elements, components, features, parts, steps, means, etc. The order of any steps discussed or depicted herein is not limited to the examples given, such that the steps may be reordered, or steps may be added or omitted, in various other embodiments. In addition, the disclosure may include other inventions not presently claimed, but which may be claimed in future.

The invention claimed is:

1. A machine that dispenses a vaporizable liquid into an e-liquid container of an electronic vapor inhalation device, the machine comprising:
   a reservoir for containing liquid;
   a vacuum pump;
   a dispensing port to receive an e-liquid container to be filled, the e-liquid container having an open end sealed by an elastomeric cover;
   a dispensing mechanism comprising a dispensing head and including:
      a liquid supply duct fluidly connected to the reservoir and terminating as a syringe needle configured to pierce the elastomeric cover of an e-liquid container received in the dispensing port, and
      a controller connected to the dispensing mechanism to control operation thereof; and
   a user-operable interface connected to the controller for a user to actuate the machine,
   wherein the dispensing mechanism comprises a vacuum duct coupled to the vacuum pump and terminating as a syringe needle configured to pierce the elastomeric cover of the e-liquid container received in the dispensing port to create a reduced pressure therein, such that liquid from the reservoir is simultaneously conveyed into the e-liquid container by being drawn into the e-liquid container through the liquid supply duct by the vacuum created therein,
   wherein the liquid supply duct syringe needle extends further into the interior of the e-liquid container than the vacuum duct syringe needle when the e-liquid container is received in the dispensing port, wherein the vacuum duct terminates adjacent to the open end of the e-liquid container such that the vacuum duct does not contact the dispensed vaporizable liquid, and
   wherein the user-operable interface is operable by a user to affect payment for supply of a quantity of the liquid from the reservoir and the machine is configured to dispense a quantity of liquid from the reservoir in response to a payment operation by a user via the user-operable interface.

2. A machine according to claim 1 further comprising a magazine of empty e-liquid containers and a delivery mechanism configured to deliver an empty e-liquid container from the magazine for subsequent insertion into the dispensing port and filling with liquid.

3. A machine according to claim 1 further comprising a magazine of empty e-liquid containers and a delivery mechanism configured to deliver an empty e-liquid container from the magazine for subsequent insertion into the dispensing port and filling with liquid.

4. A machine according to claim 3 wherein the delivery mechanism is configured to deliver an empty e-liquid container from the magazine into the dispensing port.

5. A machine according to claim 1, further comprising a cleaning mechanism configured to clean an empty e-liquid container received in the dispensing port prior to filling the empty e-liquid container with liquid from the reservoir.

6. A machine according to claim 1 comprising a plurality of reservoirs containing different liquids, wherein the dispensing mechanism is configured to selectively dispense liquid from the plurality of reservoirs to the dispensing port.

7. A machine according to claim 6 wherein the dispensing mechanism is configured to mix liquid from two or more of the plurality of reservoirs and dispense the mixed liquid to the dispensing port.

8. A machine according to claim 7 comprising at least three reservoirs respectively containing nicotine, a dilutent, and a flavorant, and wherein the dispensing mechanism is configured to mix different ratios of the nicotine, dilutent, and flavorant as the mixed liquid to be dispensed.

9. A machine according to claim 7 wherein the marking mechanism comprises a label printer configured to print a label with information relating to the dispensed liquid and adhere the label to the e-liquid container.

10. A machine according to claim 9 further comprising an e-liquid container detector configured to determine a type of e-liquid container received within the dispensing port, and wherein the controller is configured to control the dispensing mechanism to dispense an appropriate amount of liquid in dependence on the detected e-liquid container type.

11. A machine according to claim 1 further comprising an e-liquid container marking mechanism configured to mark an e-liquid container filled with liquid from the dispensing mechanism with information related to the dispensed liquid.

12. A machine according to claim 1 wherein the controller is configured only to control the dispensing mechanism to dispense liquid from the reservoir to an e-liquid container upon verification of at least one user identification criterion.

13. A machine according to claim 12 wherein the controller is configured only to control the dispensing mechanism to dispense liquid from the reservoir to an e-liquid container upon verification of minimum age information for a user.

* * * * *